United States Patent
Appleton

(10) Patent No.: US 9,194,365 B2
(45) Date of Patent: Nov. 24, 2015

(54) WIND TURBINE COMPOSITE STRUCTURES

(75) Inventor: Steve Appleton, Fleet (GB)

(73) Assignee: Vestas Wind Systems A/S, Aarhus N. (DK)

(*) Notice: Subject to any disclaimer, the term of this patent is extended or adjusted under 35 U.S.C. 154(b) by 830 days.

(21) Appl. No.: 13/376,763

(22) PCT Filed: Aug. 27, 2010

(86) PCT No.: PCT/GB2010/051424
§ 371 (c)(1),
(2), (4) Date: Jan. 18, 2012

(87) PCT Pub. No.: WO2011/024009
PCT Pub. Date: Mar. 3, 2011

(65) Prior Publication Data
US 2012/0141291 A1 Jun. 7, 2012

(30) Foreign Application Priority Data

Aug. 27, 2009 (GB) .................................. 0914960.0

(51) Int. Cl.
*F03D 1/06* (2006.01)
*B32B 5/24* (2006.01)
(Continued)

(52) U.S. Cl.
CPC ................ *F03D 1/065* (2013.01); *B32B 5/245* (2013.01); *F01D 11/00* (2013.01); *F03D 1/0675* (2013.01); *H01Q 17/00* (2013.01); *B29L 2031/085* (2013.01); *B32B 2260/00* (2013.01); *B32B 2260/023* (2013.01); *B32B 2260/046* (2013.01);
(Continued)

(58) Field of Classification Search
CPC ...... F03D 1/0675; B64C 11/205; B64C 11/24; B64C 2027/4733; B64C 2027/4736
See application file for complete search history.

(56) References Cited

U.S. PATENT DOCUMENTS 5,474,837 A    12/1995   Duke, Jr. et al.
5,576,710 A * 11/1996   Broderick et al. ................. 342/1

(Continued)

FOREIGN PATENT DOCUMENTS

GB       2 336 472      10/1999

OTHER PUBLICATIONS

Athina Nickitas-Etienne; International Preliminary Report on Patentability issued in priority International Application No. PCT/GB2010/051424; Feb. 28, 2012; 7 pages; The International Bureau of WIPO.
(Continued)

*Primary Examiner* — Ninh H Nguyen
*Assistant Examiner* — Jeffrey A Brownson
(74) *Attorney, Agent, or Firm* — Wood, Herron & Evans, LLP

(57) ABSTRACT

A wind turbine composite structure for absorbing radio frequency energy, the wind turbine composite structure comprising: a sandwich panel construction comprising a core having an inner surface and an outer surface, disposed between an inner skin and an outer skin; the outer surface and the outer skin facing towards an exterior surface of the wind turbine composite structure and the inner surface and the inner skin facing towards an interior of the wind turbine composite structure; a reflector layer disposed adjacent to the inner skin; and a functional layer comprising printed or deposited circuitry, the functional layer forming a radar absorbing circuit in combination with the reflector layer, wherein the functional layer is printed or deposited directly on to the outer surface of the core.

12 Claims, 2 Drawing Sheets

(51) Int. Cl.
  *F01D 11/00* (2006.01)
  *H01Q 17/00* (2006.01)
  *B29L 31/08* (2006.01)

(52) U.S. Cl.
  CPC ......... *B32B 2603/00* (2013.01); *F05B 2260/99* (2013.01); *F05B 2280/6003* (2013.01); *F05D 2300/603* (2013.01); *Y02E 10/721* (2013.01); *Y02E 10/726* (2013.01); *Y02T 50/672* (2013.01); *Y10T 29/49002* (2015.01)

(56) References Cited

U.S. PATENT DOCUMENTS 5,627,541 A    5/1997   Haley et al.
6,538,596 B1   3/2003   Gilbert

OTHER PUBLICATIONS

European Patent Office, EP Office Action issued in corresponding EP Application No. 10760384.7-1703 dated Feb. 5, 2014, 4 pages.

Stephen G. Appleton; Design & Manufacture of Radar Absorbing Wind Turbine Blades—Final Report; Feb. 2005; 16 pages.

C.A. Jackson et al.; Option for Mitigation of the Effects of Windfarms on Radar Systems; Undated; 8 pages; Chelmsford Essex, UK.

Author Unknown; Stealth Technology for Wind Turbine; Copyright 2008; 14 pages; The Department for Business Enterprise & Regulatory Reform.

Steve Appleton; Stealth Blade—a progress report; undated; 4 pages; QinetiQ.

J. Pinto et al; Radar Signature Reduction of Wind Turbines through the Application of Stealth Technology; undated; 6 pages; Chelmsford Essex, UK.

John Watt; Combined Search and Examination Report issued in priority Great Britain Application No. GB0914960.0; Dec. 11, 2009; 11 pages; Great Britain Intellectual Property Office.

Monica Lozza; International Search Report and Written Opinion issued in priority International Application No. PCT/GB2010/051424; Jan. 26, 2011; 11 pages; European Patent Office.

\* cited by examiner

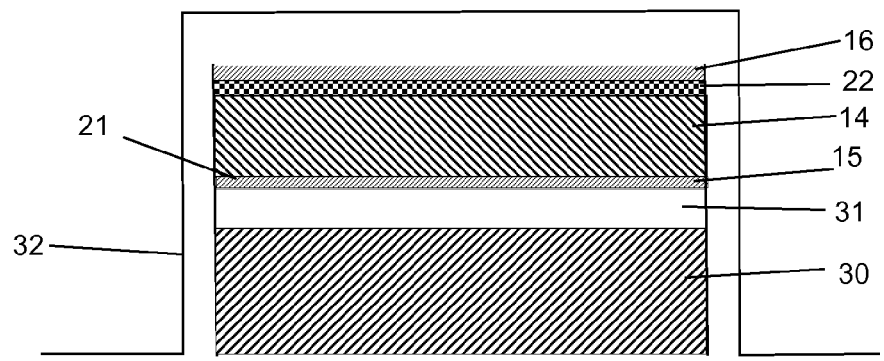
Figure 3
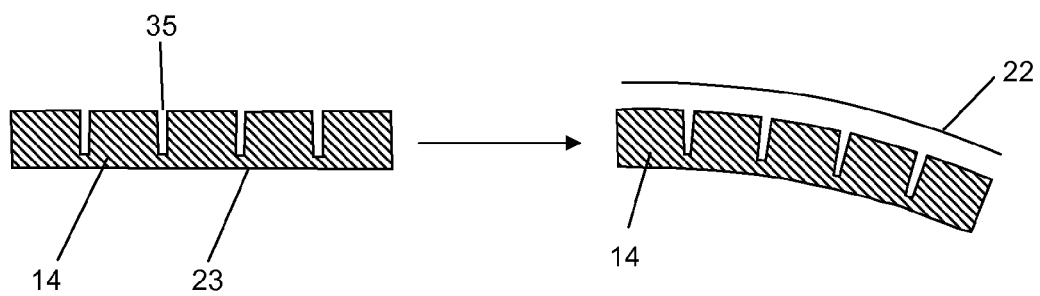
Figure 4a
Figure 4b

WIND TURBINE COMPOSITE STRUCTURES

The present invention relates to core materials used in the manufacture of wind turbine blades. In particular, the present invention relates to sandwich panel constructions used in wind turbines and incorporating a radar absorbing material into such a sandwich panel.

Wind turbine blades are typically constructed from reinforced composite materials. A typical blade is fabricated in two shells, which are subsequently bonded to form an aerodynamic profile. The shells include at particular location sandwich panel regions having a core of lightweight material such as foam or balsa wood.

It is known that wind turbines can cause problems when they are detected by radar. In particular this is because the rotating blades of the wind turbine have a radar signature similar to the radar signature of aircraft. This causes problems for air traffic control and other radar operators to distinguish between aircraft and wind turbines.

It is an object of this invention to reduce the radar signature of wind turbines so that they can be easily distinguished from aircraft on a radar screen, and which will also create less clutter on the screen of the radar operator.

It is also an object of this invention to provide a structure that can be easily and efficiently manufactured.

According to a first aspect of the present invention there is provided a wind turbine composite structure for absorbing radio frequency energy, the wind turbine composite structure comprising:

a sandwich panel construction comprising a core having an inner surface and an outer surface, disposed between an inner skin and an outer skin; the outer surface and the outer skin facing towards an exterior surface of the wind turbine composite structure and the inner surface and the inner skin facing towards an interior of the wind turbine composite structure;

a reflector layer disposed adjacent to the inner skin; and a functional layer comprising printed or deposited circuitry, the functional layer forming a radar absorbing circuit in combination with the reflector layer, wherein the functional layer is printed or deposited directly on to the outer surface of the core.

By providing the functional layer directly on the outer surface of the core, rather than on a separate substrate such as glass cloth, is advantageous because no additional material is required in the manufacture of the composite structure. This removes any weight penalties that would arise if additional materials were to be incorporated into the composite structure and removes the need for additional material preparation.

Preferably, the functional layer is a circuit analogue layer. A circuit analogue layer is comprised of an array of elements, such as monopoles, dipoles, loops, patches or other geometries. The elements are made from a material which has controlled high frequency resistance. The element material and the geometry of the array elements are designed such that the functional layer exhibits a chosen high frequency impedance spectrum. The impedance spectrum is chosen such that the functional layer and the reflector layer form a radar absorbing circuit in the composite structure. Different impedance spectra are required for different composite structures, for example having different core thicknesses.

The circuit analogue layer may be printed directly on the outer surface of the core by screen printing. The circuit analogue layer may be formed from carbon ink which can be printed by screen printing in a conventional method.

The reflector layer may include a layer of carbon tissue.

The reflector layer may include a frequency selective surface. The frequency selective surface may comprise a circuit analogue layer printed or deposited on a substrate. The circuit analogue layer which makes up the reflector layer will have properties that are complementary with the functional layer so that the two layers in combination operate as a radar absorbing material at the required frequencies only. Radiation at other frequencies may either be reflected or allowed to transmit through the frequency selective reflector, depending on the design.

Preferably, the inner skin and the outer skin are fabricated from at least one layer of a fibre and resin composite matrix.

A wind turbine blade may be provided having the composite structure as described above.

A wind turbine nacelle may be provided having a composite structure as described above.

According to a second aspect of the present invention there is provided a method of manufacturing a wind turbine composite structure for absorbing radio frequency energy, the method comprising:

assembling a sandwich panel construction comprising a core having an inner surface and an outer surface, disposed between an inner skin and an outer skin; the outer surface and the outer skin facing towards an exterior surface of the wind turbine composite structure and the inner surface and the inner skin facing towards an interior of the wind turbine composite structure;

providing a reflector layer disposed adjacent to the inner skin;

providing a functional layer comprising printed or deposited circuitry, the functional layer forming a radar absorbing circuit in combination with the reflector layer, wherein the functional layer is printed or deposited directly on to the outer surface of the core.

An example of the invention will be described with reference to the following Figures in which:

FIG. 3 shows a cross section of a sandwich panel construction according to the present invention in a mould.

FIGS. 4a and 4b show a core construction according to the present invention.

Figure 1:
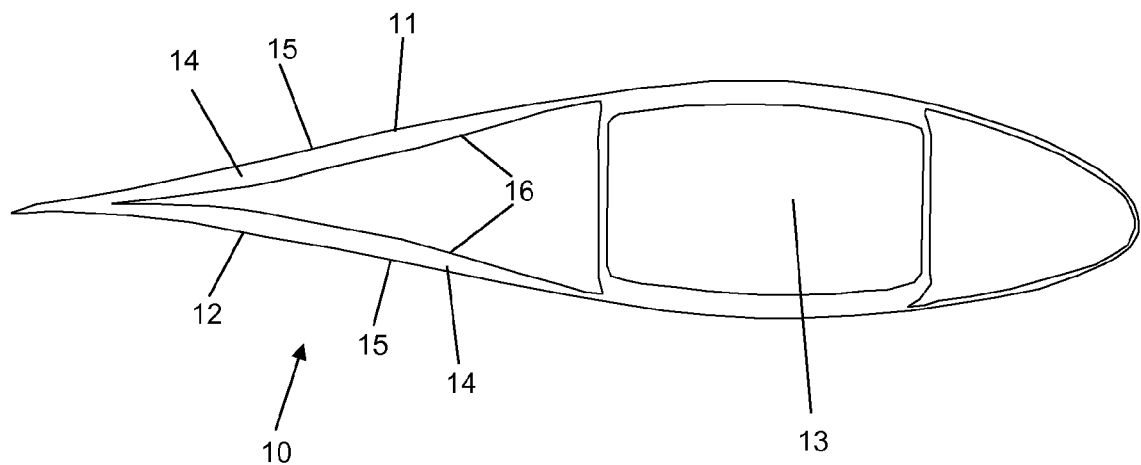
FIG. 1 shows a cross section of a wind turbine rotor blade.

FIG. 1 shows a cross section of a typical wind turbine rotor blade 10. The rotor blade 10 is constructed, in a manner well known in the art, from two aerodynamic shells, upper shell 11 and lower shell 12 which are formed from a glass fibre cloth and resin composite. The shells 11 and 12 are supported by a tubular structural spar 13 formed from glass fibre and carbon fibre.

The spar 13 forms the primary strengthening structure of the rotor blade 10. At the rear of each shell 11 and 12 towards the trailing edge of the rotor blade, the shells are formed with a sandwich construction, that is a foam core 14 bonded between sheets of glass fibre 15 and 16. The foam core 14 is used to separate the glass fibre layers 15 and 16 to keep the shell stiff in this region.

FIG. 2a shows, in an exploded view, a part of the sandwich construction from the rear of the rotor blade 10. The sandwich panel construction comprises the core 14 which has an inner surface 20 and an outer surface 21. The core 14 is disposed between the inner skin of glass fibre composite 16 and the outer skin of glass fibre composite 15. The outer surface 21 and the outer skin 15 face towards an exterior surface of the rotor blade 10 and the inner surface 20 and the inner skin 16 face towards an interior of the rotor blade 10.

In this example, the core 14 is an open cell structured foam core. However, other suitable materials may be used, such as closed cell structured foam, synthetic foam or balsa wood.

A reflector layer 22 is disposed adjacent to the inner skin 16, that is between the inner skin 16 and the core 14. However, the reflector layer 22 may be provided on an inner surface of the inner skin 16. In this example, the reflector layer 22 is a carbon cloth layer, which functions as a back reflector for radar—it may also sometimes be referred to as a ground plane.

A circuit analogue layer 23 is provided on the outer surface 21 of the core 14. The circuit analogue layer is a functional layer comprising printed or deposited circuitry, which forms a radar absorbing circuit in combination with the reflector layer 22. The circuit analogue layer 23 comprises a carbon-ink circuit printed directly on to the outer surface 21 of the core 14. When radar waves are incident upon the rotor blade 10, the combination of the circuit analogue layer 23 and the reflector layer 22 act to absorb the radar waves so that they are not reflected back to the radar source.

Figure 2:
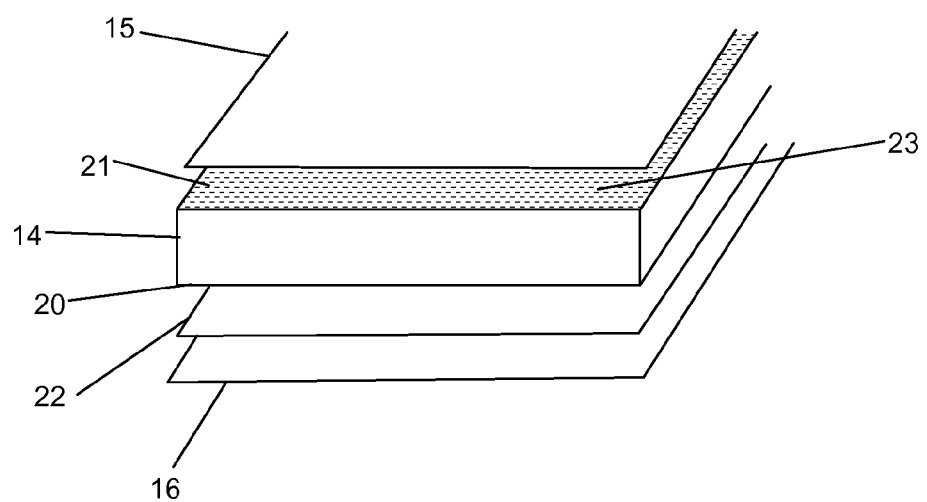
FIG. 2 shows a sandwich panel construction according to the present invention.

FIG. 2 shows an exploded view of a section of the sandwich panel. The outer and inner skins 15, 16, the core 14 and the reflector layer are all bonded together by use of a suitable adhesive or resin.

By providing the circuit analogue layer 23 directly on the core 14 means that it is not necessary to provide a separate substrate on which the circuit analogue layer 23 is provided. Therefore, it is not necessary to provide a substrate such as plain weave glass cloth on which the circuit analogue pattern is printed.

Accordingly, this structure is advantageous because there is no need for a separate layer of material between the core 14 and the outer surface 15. This results in reduced materials cost and manufacturing time and saves weight because there is not an additional layer of material.

The sandwich panel construction shown in FIG. 2 will be constructed in the following manner, with reference to FIG. 3. First, the outer surface layer 15 is laid in a mould 30, which is coated with a gel coat 31. Then the core 14 with the circuit analogue layer 23 already printed on its surface is placed on the outer surface layer 15. Subsequently, the reflector layer 22 and the inner surface 16 are placed on surface 20 of the core 14. A bleed fabric and a vacuum bag or vacuum film 32 are placed over the construction and the outer surface layer 15, any slits and holes which are intentionally made to the core 14 and the inner surface layer 16 are impregnated with a matrix material such as a curable epoxy resin to bind the layers together when a vacuum is applied to the structure and the structure is cured under the vacuum and applied heat.

Once the curing process is complete, the resulting gel-coated composite sandwich structure is released from the mould 30. The cured gel coat 31 provides a high quality and highly durable UV and hydrolysis-resistant coating on the external surface of the composite sandwich structure, which may also be painted to further enhance durability and to achieve required visual properties.

The separation between the circuit analogue layer 23 and the reflector layer 22 must be taken into account in the design of the circuit analogue layer 23, as must the thickness and properties of the matrix material and the outer and inner layers 15 and 16. In this example, the relative separation between the circuit analogue layer 23 and the reflector layer 22 is determined by the thickness of the core 14, which separates these two layers in the composite structure. For a given design of circuit analogue layer 23, a consistent radar absorbing performance is achieved by ensuring that the core 14 is of substantially uniform thickness across the composite sandwich structure. The wind turbine rotor blade 10 will require different thickness of core for the sandwich construction at different positions in the rotor blade for strength reasons. For instance, referring to FIG. 1, it can be seen that the core 14 is thicker towards the trailing edge of the rotor blade 10 than towards the spar 13. Each different thickness of core will require a circuit analogue layer 23 having different properties. However, as the circuit analogue layer 23 is printed directly on the core 14, this means that for every thickness of core layer 14, it has an associated circuit analogue layer 23 that has the correct properties for that core thickness.

Accordingly, when manufacturing a wind turbine rotor blade 10 that has multiple core thicknesses, when a core section is place in the mould it will be ensured that the core thickness has the correct circuit analogue layer; because each different core section will be pre-printed with the circuit analogue layer thereon. This avoids any errors in the manufacturing process which may occur if a separate substrate having the circuit analogue thereon had to be matched with each different core layer thickness. As a result, manufacturing errors and the time it takes to build the composite structure are reduced.

As shown in the example of FIG. 4a, the core 14 is provided with several parallel slits 35. These slits 35 facilitate draping of the core 14 so that the core 14 may conform to a curvature of the blade shell, as shown in FIG. 4b. Different regions of a blade have different curvatures, consequently, the core 14 may be required to drape to different extents in different regions of the blade. The reflector layer 22 will follow the curvature of the core 14. The circuit analogue layer 23 is provided on the surface of the core 14 opposite to the slits 35.

The circuit analogue absorber is, in this example, printed directly on the outer surface 21 of the core 14 by screen printing. However, it may be printed or deposited on the core by any other suitable method.

As described earlier, the reflector layer 22 is formed from carbon cloth. However, in another example, the reflector layer 22 may comprise a frequency selective surface, and the frequency selective surface is a circuit analogue layer printed or deposited on a substrate. Such a substrate may be plain weave glass cloth. The frequency selective layer that forms the reflector layer 22 may also be printed directly on the inner surface 20 of the core 14, if the geometries of the slits 35 in the core 14, which are used to aid draping of the core 14 around curvatures, are taken into account.

As has been described above, the composite structure forms part of a wind turbine rotor blade 10. However, the invention can also be used at any other location on the wind turbine where a sandwich panel construction is used. For example, another location would be a wind turbine nacelle where sandwich panels are used in the construction.

The invention claimed is:

1. A wind turbine blade for absorbing radio frequency energy, comprising:

an upper shell and a lower shell, each shell having an outer skin facing towards an exterior surface of the wind turbine blade and an inner skin facing an interior of the wind turbine blade, wherein a portion of at least one of the upper and lower shells has a sandwich panel construction comprising:

a core having an inner surface and an outer surface and disposed between the inner skin and outer skin of the portion of the at least one of the upper and lower shells, the outer surface facing towards an exterior surface of the wind turbine blade and the inner surface facing towards an interior of the wind turbine blade, the core having a varying thickness along a length of the portion of the at least one of the upper and lower shells;

a reflector layer disposed adjacent to the inner skin of the portion of the at least one of the upper and lower shells; and a functional layer comprising circuitry printed or deposited directly onto the outer surface of the core, the functional layer forming a radar absorbing circuit in combination with the reflector layer, wherein the printed or deposited circuitry varies along the length of the portion of the at least one of the upper and lower shells in relation to the thickness of the core.

2. The wind turbine blade according to claim 1, wherein the functional layer is a circuit analogue layer.

3. The wind turbine blade according to claim 2, wherein circuit analogue layer is printed directly on the outer surface of the core by screen printing.

4. The wind turbine blade according to claim 1, wherein the reflector layer includes a layer of carbon tissue.

5. The wind turbine blade according to claim 1, wherein the reflector layer includes a frequency selective surface.

6. The wind turbine blade according to claim 5, wherein the frequency selective surface comprises a circuit analogue layer printed or deposited on a substrate.

7. The wind turbine blade according to claim 1, wherein the inner skin and the outer skin are fabricated from at least one layer of a fibre and resin composite matrix.

8. A method of manufacturing a wind turbine blade for absorbing radio frequency energy, the wind turbine blade having an upper shell and a lower shell, comprising:

forming a portion of at least one of the upper shell and lower shell as a sandwich panel construction, the forming step further comprising:

providing an inner skin and an outer skin, the inner skin configured to face the interior of the wind turbine blade and the outer skin configured to face the exterior of the wind turbine blade;

providing a core having an inner surface and an outer surface disposed between the inner skin and outer skin, the outer surface facing towards the exterior surface of the wind turbine blade and the inner surface facing towards an interior of the wind turbine blade, the core having a varying thickness along a length of the portion of the at least one of the upper and lower shells;

providing a reflector layer disposed adjacent to the inner skin of the at least one of the upper and lower shells; and providing a functional layer comprising circuitry printed or deposited directly onto the outer surface of the core, the functional layer forming a radar absorbing circuit in combination with the reflector layer, wherein the printed or deposited circuitry varies along the length of the portion of the at least one of the upper and lower shells in relation to the thickness of the core.

9. The wind turbine blade according to claim 1, wherein the portion of at least one of the upper and lower shells is adjacent a trailing edge of the wind turbine blade.

10. The wind turbine blade according to claim 9, wherein the thickness of the core increases in a direction toward the trailing edge of the wind turbine blade.

11. The wind turbine blade according to claim 1, wherein a portion of both the upper shell and lower shell has a sandwich panel construction.

12. The wind turbine blade according to claim 1, wherein the portion of both the upper and shell having the sandwich panel construction is adjacent a trailing edge of the wind turbine blade.

* * * * *

UNITED STATES PATENT AND TRADEMARK OFFICE
CERTIFICATE OF CORRECTION

| | | |
|---|---|---|
| PATENT NO. | : 9,194,365 B2 | Page 1 of 1 |
| APPLICATION NO. | : 13/376763 | |
| DATED | : November 24, 2015 | |
| INVENTOR(S) | : Steve Appleton | |

It is certified that error appears in the above-identified patent and that said Letters Patent is hereby corrected as shown below:

In the Specification:

At column 1, line number 11, after "include" delete "at"

At column 3, line 16, change "act" to --acts--

In the Claims:

At column 5, claim number 3, line number 12, after "wherein" insert --the--

At column 6, claim number 12, line number 30, change "The wind turbine blade according to claim 1, wherein the portion of both the upper and shell" to --The wind turbine blade according to claim 11, wherein the portion of both the upper shell and lower shell--

Signed and Sealed this
Tenth Day of May, 2016

Michelle K. Lee
*Director of the United States Patent and Trademark Office*